US005393034A

United States Patent [19]

Mendez

[11] Patent Number: 5,393,034

[45] Date of Patent: Feb. 28, 1995

[54] AIR SHUTOFF VALVE FOR A HOPPER GUN

[76] Inventor: Richard O. Mendez, 1141 E. Renton St., Carson, Calif. 90745

[21] Appl. No.: 265,756

[22] Filed: Jun. 27, 1994

[51] Int. Cl.[6] ............................................ F16K 31/44

[52] U.S. Cl. .................................... 251/148; 251/231; 251/357

[58] Field of Search ............... 251/356, 357, 231, 148; 173/169; 137/613, 614.19

[56] References Cited

U.S. PATENT DOCUMENTS

| | | | |
|---|---|---|---|
| 3,137,476 | 6/1964 | Rotheraine et al. | 251/357 |
| 3,970,110 | 7/1976 | Schaedler et al. | 137/613 |
| 4,525,910 | 7/1985 | Boehmer | 251/357 |
| 4,834,294 | 5/1989 | Herzog | 251/231 |
| 5,060,771 | 10/1991 | Robinson | 173/169 |
| 5,197,711 | 3/1993 | Geiger et al. | 251/148 |

*Primary Examiner*—A. Michael Chambers

[57] ABSTRACT

Disclosed is a new air shutoff valve for a hopper gun for on/off control of inlet air synchronized to existing on/-off control of texture coating mixture. The air shutoff valve comprises a tubular valve stem disposed within the air stem of the hopper gun. The valve stem has an air inlet port proximal a first end and an open second end. A valve control element controls airflow into the hopper gun by selectively obstructing the inlet aperture of the male quick disconnect air fitting. The valve control element comprises a resilient conical frustum-shaped plug disposed partially within the inlet end of the male fitting whereby pressurized air attempting to enter will seat the plug against the inlet aperture to stop airflow. The small end of the plug is fixedly connected to the first end of the valve stem. When the trigger is actuated the plug and first end of the valve stem enter the female quick disconnect air supply fitting mated to the male fitting and the air inlet port moves into the air stream allowing air to flow through the valve stem and air stem for propelling the mixture.

13 Claims, 4 Drawing Sheets

AIR SHUTOFF VALVE FOR A HOPPER GUN

BACKGROUND OF THE INVENTION

1. Field of the Invention

The present invention relates to air control valves and more particularly pertains to an air shutoff valve for a hopper gun which may be adapted for on/off control of inlet air synchronized to existing on/off control of texture coating mixture and the like.

2. Description of the Prior Art

The use of air control valves is known in the prior art. More specifically, air control valves heretofore devised and utilized for the purpose of controlling airflow to air-powered devices are known to consist basically of familiar, expected and obvious structural configurations, notwithstanding the myriad of designs encompassed by the crowded prior art which have been developed for the fulfillment of countless objectives and requirements.

The present invention is directed to improving devices for controlling airflow to air-powered devices in a manner which is safe, secure, economical and aesthetically pleasing.

Relevant prior art patents include U.S. Pat. No. 5,060,771 to Robinson which describes an adjustable automatic shut-off mechanism for lever or trigger controlled air tool, U.S. Pat. No. 4,534,538 to Buckley et al. showing a modular air shut-off valve, and U.S. Pat. No. 4,176,823 to Gliatas which discloses a butterfly valve.

The prior art also discloses a safety inlet air valve control arrangement for air powered hand held tool as shown in U.S. Pat. No. 3,970,110 to Schaedler et al. and a metering valve with air shutoff of U.S. Pat. No. 3,591,059 to Stearns.

While these devices fulfill their respective, particular objectives and requirements, the aforementioned patents do not disclose an air shutoff valve for a hopper gun for on/off control of inlet air synchronized to existing on/off control of texture coating and the like.

In this respect, the air shutoff valve for a hopper gun according to the present invention substantially departs from the conventional concepts and designs of the prior art, and in so doing provides an apparatus primarily developed for the purpose of on/off control of inlet air synchronized to existing on/off control of texture coating mixture and the like.

Therefore, it can be appreciated that there exists a continuing need for a new air shutoff valve for a hopper gun which can be used for on/off control of inlet air synchronized to existing on/off control of texture coating mixture and the like in a hopper spray gun having a conventional male quick disconnect air inlet fitting which feeds pressurized air into an inlet end of a longitudinally rearwardly movable trigger actuated air stem for propelling the texture coating mixture and the like onto a surface to be coated. In this regard, the present invention substantially fulfills this need.

As illustrated by the background art, efforts are continuously being made in an attempt to develop devices for controlling airflow to air-powered devices. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of air control valves now present in the prior art, the present invention provides a new air control valve construction wherein the same can be utilized for on/off control of inlet air synchronized to existing on/off control of texture coating mixture and the like. As such, the general purpose of the present invention, which will be described subsequently in greater detail, is to provide a new air shutoff valve for a hopper gun apparatus and method which has all the advantages of the prior art air control valves and none of the disadvantages.

The invention is defined by the appended claims with the specific embodiment shown in the attached drawings. For the purpose of summarizing the invention, the invention may be incorporated into a new air shutoff valve for a hopper gun for on/off control of inlet air synchronized to existing on/off control of texture coating mixture and the like in a hopper spray gun having a conventional male quick disconnect air inlet fitting which feeds pressurized air into an inlet end of a longitudinally rearwardly movable trigger actuated air stem for propelling the texture coating mixture and the like onto a surface to be coated.

The air shutoff valve for a hopper gun comprises a tubular valve stem disposed within the air stem of the hopper gun such that an open first end of the valve stem lies within the male quick disconnect air fitting proximal the inlet aperture of the fitting. The valve stem has at least one air inlet port through a wall thereof proximal the first end thereof. The valve stem also has an open second end.

A valve control element controls airflow into the hopper gun by selectively obstructing the inlet aperture of the male quick disconnect air fitting. The valve control element comprises a resilient conical frustum-shaped plug having a large end diameter larger than the inside diameter of the male fitting inlet aperture and a small end diameter smaller than the inside diameter of the male fitting inlet aperture. The plug is disposed partially within the inlet end of the male fitting such that the large end lies outside the inlet aperture whereby pressurized air attempting to enter the fitting will seat the plug against the inlet aperture to stop the airflow. The small end of the plug is fixedly connected to the first end of the valve stem such that the plug projects longitudinally therefrom and prevents pressurized air from flowing therethrough.

The large end of the plug is smaller than the inside diameter of a female quick disconnect air supply fitting mated to the male fitting. This allows the plug and first end of the valve stem to enter the female fitting when the valve stem is forced rearwardly by the rearwardly moving trigger actuated hopper gun air stem. The at least one air inlet port of the valve stem is moved into the air stream allowing the pressurized air to flow through the valve stem and out the second end thereof to enter the hopper gun air stem for propelling the texture coating mixture and the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new air shutoff valve for a hopper gun for on/off control of inlet air synchronized to existing on/-off control of texture coating mixture.

It is another object of the present invention to provide a new air shutoff valve for a hopper gun which may be easily and efficiently manufactured and marketed.

It is a further object of the present invention to provide a new air shutoff valve for a hopper gun which is of a durable and reliable construction.

An even further object of the present invention is to provide a new air shutoff valve for a hopper gun which is susceptible of a low cost of manufacture with regard to both materials and labor, and which accordingly is then susceptible of low prices of sale to the consuming public, thereby making such air shutoff valves for a hopper gun economically available to the buying public.

Still yet another object of the present invention is to provide a new air shutoff valve for a hopper gun which provides in the apparatuses and methods of the prior art some of the advantages thereof, while simultaneously overcoming some of the disadvantages normally associated therewith.

Still yet another object of the present invention is to provide a new air shutoff valve for a hopper gun which may be fitted to existing hopper spray guns having a conventional male quick disconnect air inlet fitting which feeds pressurized air into an inlet end of a longitudinally rearwardly movable trigger actuated air stem for propelling the texture coating mixture and the like onto a surface to be coated.

Yet another object of the present invention is to provide a new air shutoff valve for a hopper gun that is actuated by the trigger of the gun thereby requiring only one hand for use.

Even still another object of the present invention is to provide a new air shutoff valve for a hopper gun that requires no modification to the hopper gun during installation.

Yet still another object of the present invention is to provide a new air shutoff valve for a hopper gun that is quick and easy to install.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
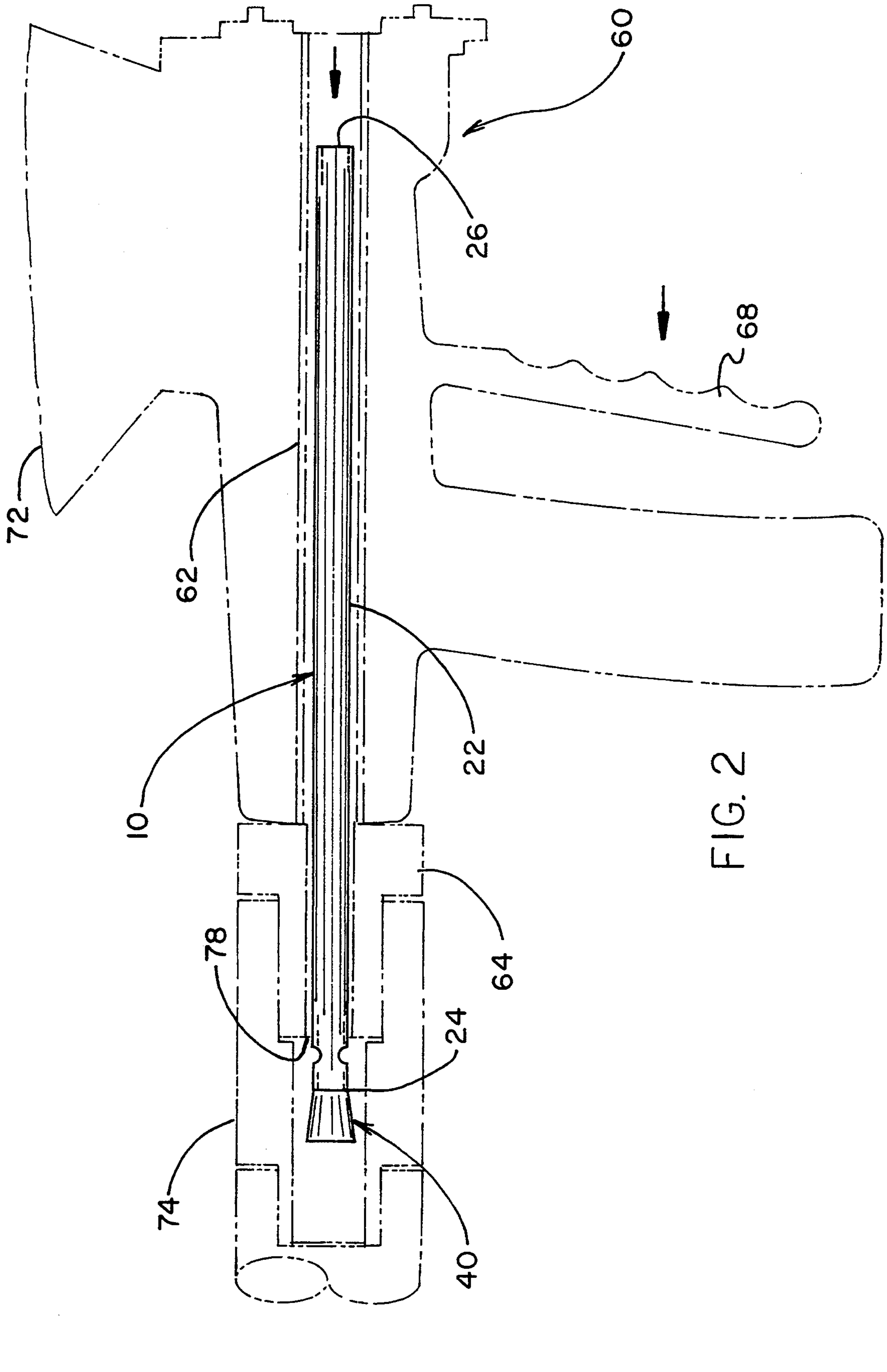
FIG. 2 is a side elevational view of the invention of FIG. 1 shown in the "on" position.
Figure 3:
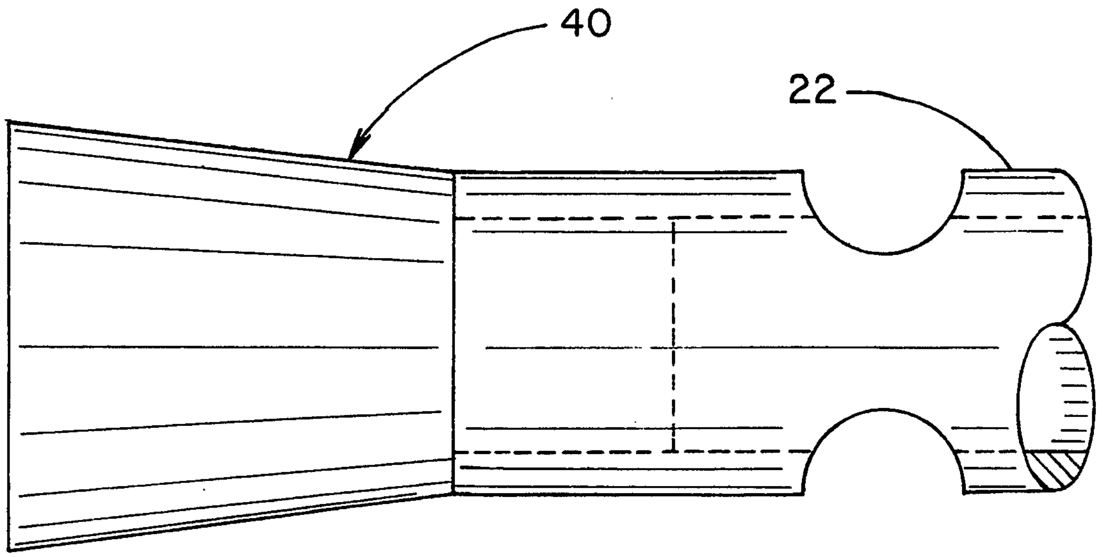
FIG. 3 is a partial side elevational view of the preferred embodiment of the new air shutoff valve for a hopper gun illustrating the air inlet ports and the valve control element plug attached to the valve stem.
Figure 4:
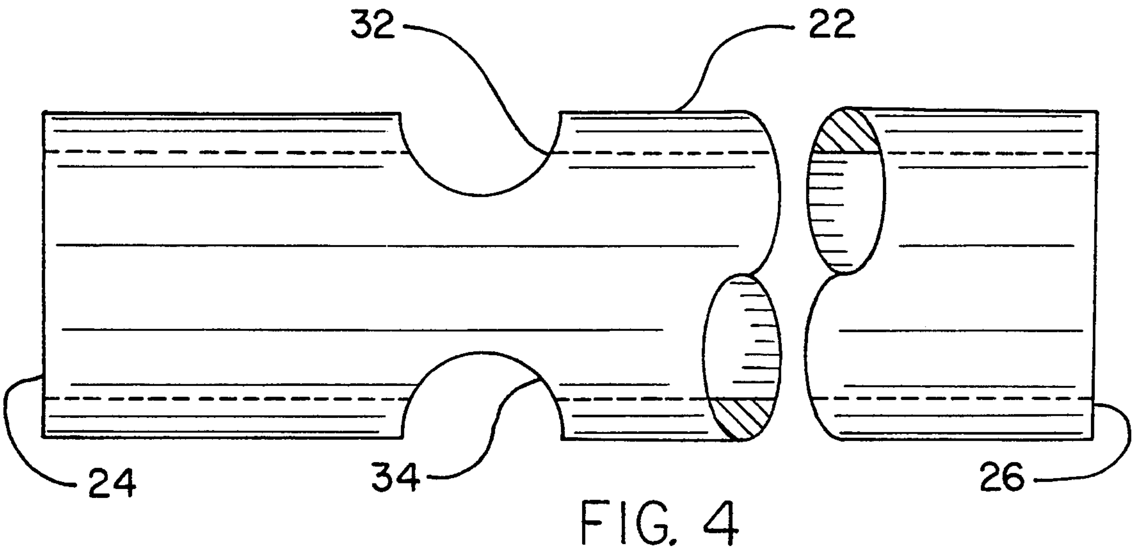
FIG. 4 is a segmented side elevational view of the valve stem of the invention of FIG. 3.
Figure 5:
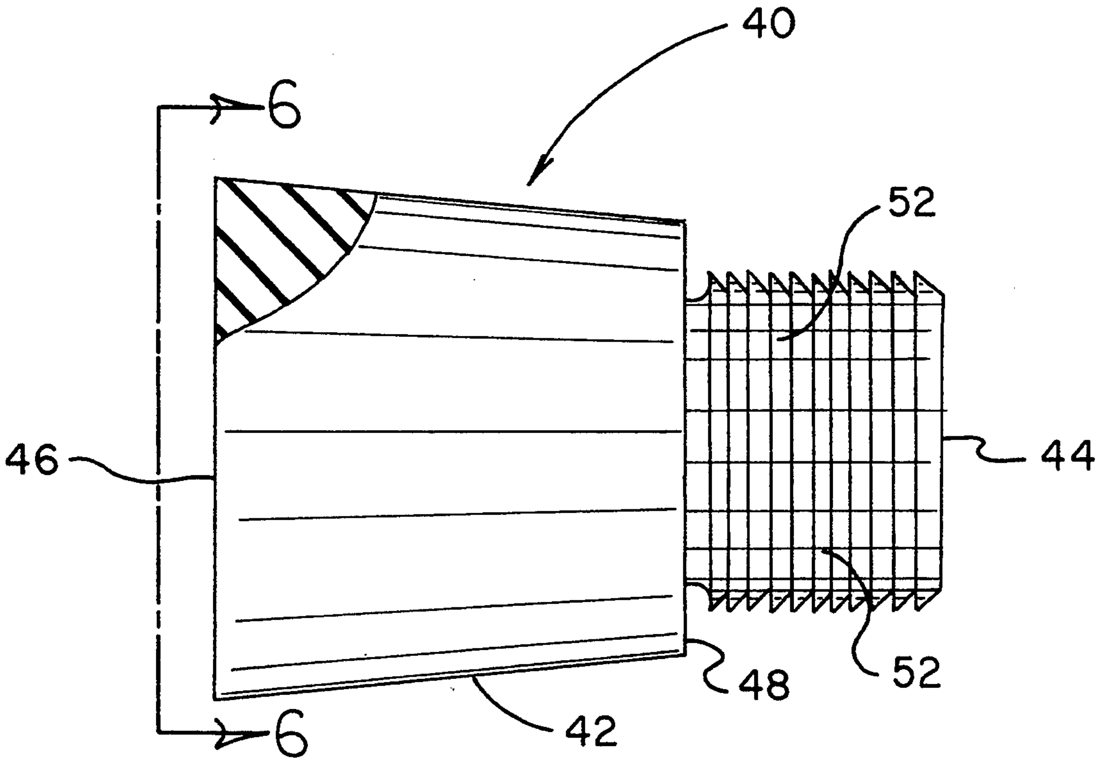
FIG. 5 is a partially cutaway side elevational view of the valve control element plug of the invention of FIG. 3.
Figure 6:
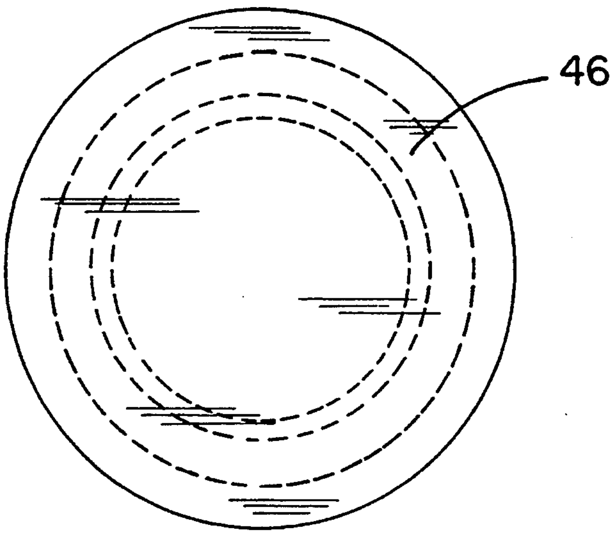
FIG. 6 is rear elevational view of the plug of FIG. 6.

With reference now to the drawings, and in particular to FIG. 2 thereof, a new air shutoff valve for a hopper gun embodying the principles and concepts of the present invention and generally designated by the reference numeral 10 will be described.

Figure 1:
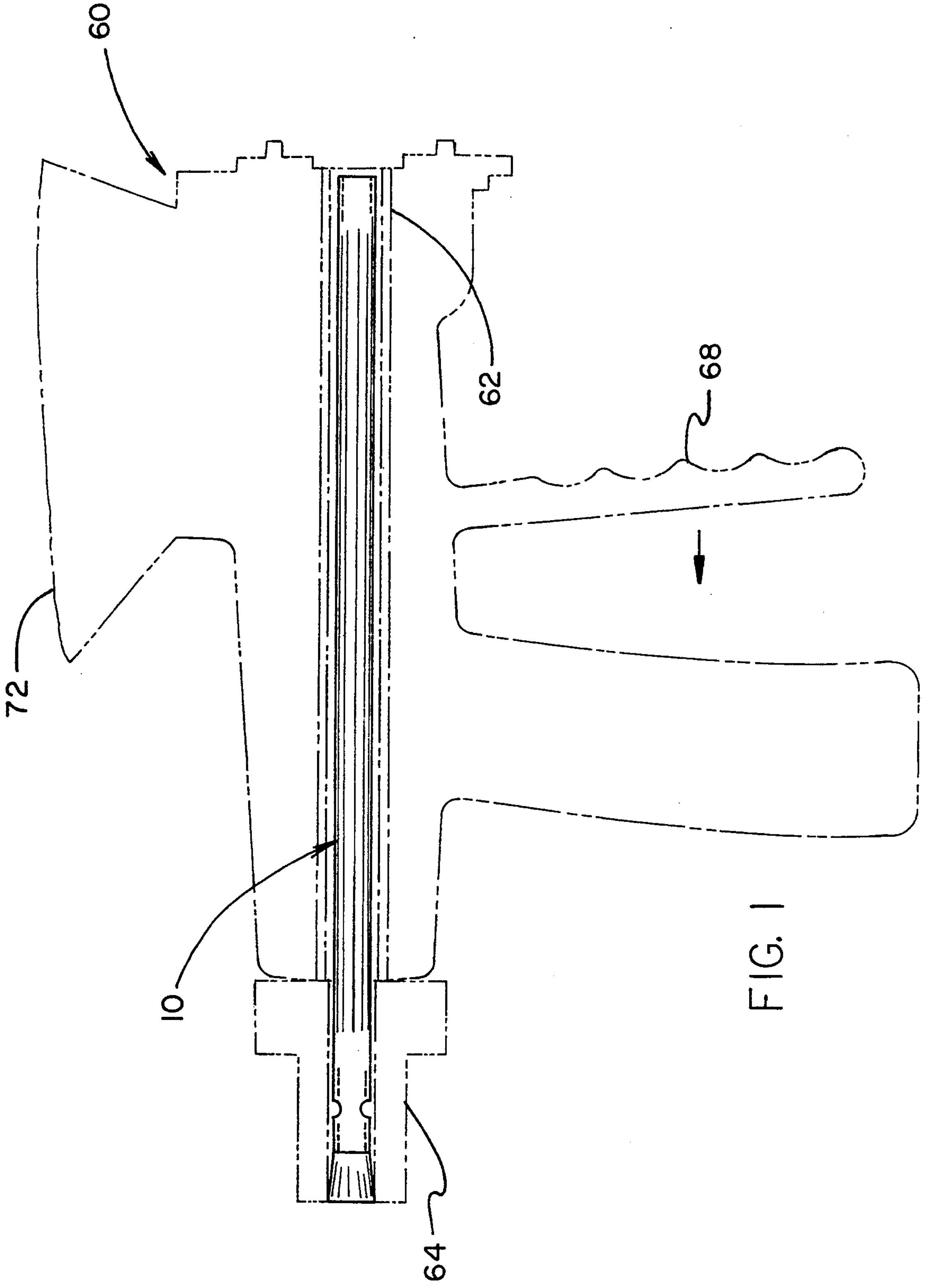
FIG. 1 is a side elevational view of the preferred embodiment of the present invention in which the hopper gun with male quick disconnect air fitting is represented by phantom lines and the invention is shown in the "off" position.

From an overview standpoint, the air shutoff valve for a hopper gun is adapted for use for on/off control of inlet air synchronized to existing on/off control of texture coating and the like in a hopper spray gun having a conventional male quick disconnect air inlet fitting which feeds pressurized air into an inlet end of a longitudinally rearwardly movable trigger actuated air stem for propelling the texture coating mixture and the like onto a surface to be coated. See FIGS. 1 and 2.

With reference now to FIGS. 1–6 and more specifically, it will be noted that a new air shutoff valve for a hopper gun 10 is shown.

The air shutoff valve for a hopper gun 10 comprises a tubular valve stem 22 formed of 0.175 inch O.D. brass tube having an I.D. of 0.165 inches and a length of 6 inches. The stem 22 is disposed within the air stem 62 of the hopper gun 60 such that an open first end 24 of the valve stem 22 lies within the male quick disconnect air fitting 64 proximal the inlet aperture 78 of the fitting 64. The valve stem 22 has a pair of 0.080 inch diameter opposing air inlet ports 32 and 34 through the wall thereof spaced 0.310 inches from the first end 24 thereof. The valve stem 22 also has an open second end 26.

A valve control element 40 controls airflow into the hopper gun by selectively obstructing the inlet aperture 78 of the male quick disconnect air fitting 64. The valve control element 40 comprises a resilient conical frustum-shaped neoprene plug 42 having a length of 0.210 inches and a large end 46 diameter of 0.185 inches tapering to 0.175 inches at the small end 48. The large end 46 diameter is larger than the inside diameter of the male fitting inlet aperture 78 and the small end 48 diameter is smaller than the inside diameter of the male fitting inlet aperture 78.

The plug 42 is disposed partially within the inlet end of the male fitting 64 such that the large end 46 lies outside the inlet aperture 78 whereby pressurized air attempting to enter the fitting 64 will seat the plug against the inlet aperture 78 to stop the airflow. The small end 48 of the plug is fixedly connected to the first end 24 of the valve stem 22 by means of a resilient cylindrical lug 44 integrally formed on the plug 42. The lug 44 projects coaxially from the small end 48 of the plug and has a plurality of resilient annular barbs 52 formed thereon which are frictionally engaged within the first end 24 of the valve stem 22. The plug 42 also prevents pressurized air from flowing through the first end of the valve stem.

The large end 46 of the plug is smaller than the inside diameter of a female quick disconnect air supply fitting 74 mated to the male fitting 64. This allows the plug 42 and first end 24 of the valve stem 22 to enter the female fitting when the valve stem is forced rearwardly by the rearwardly moving trigger 68 actuated hopper gun air stem 62. The air inlet ports 32 and 34 of the valve stem 22 are moved into the air stream allowing the pressurized air to flow through the valve stem 22 and out the second end 26 thereof to enter the hopper gun air stem 62 for propelling the texture coating mixture and the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

CLAIMS

What is claimed is:

1. A new air shutoff valve for a hopper gun for on/off control of inlet air synchronized to existing on/off control of texture coating and the like in a hopper spray gun having a conventional male quick disconnect air inlet fitting which feeds pressurized air into an inlet end of a longitudinally rearwardly movable trigger actuated air stem for propelling the texture coating mixture and the like onto a surface to be coated, the air shutoff valve for a hopper gun comprising:

- a tubular valve stem disposed within the air stem of the hopper gun such that an open first end of the valve stem lies within the male quick disconnect air fitting proximal the inlet aperture of the fitting, the valve stem having at least one air inlet port through a wall thereof proximal the first end thereof, the valve stem also having an open second end; and
- a valve control element for controlling airflow into the hopper gun by selectively obstructing the inlet aperture of the male quick disconnect air fitting.

2. The air shutoff valve for a hopper gun of claim 1 wherein the valve control element comprises a resilient conical frustum-shaped plug having a large end diameter larger than the inside diameter of the male fitting inlet aperture and a small end diameter smaller than the inside diameter of the male fitting inlet aperture, the plug being disposed partially within the inlet end of the male fitting such that the large end lies outside the inlet aperture whereby pressurized air attempting to enter the fitting will seat the plug against the inlet aperture to stop the airflow, the small end of the plug being fixedly connected to the first end of the valve stem such that the plug projects longitudinally therefrom and prevents pressurized air from flowing therethrough, the large end of the plug being smaller than the inside diameter of a female quick disconnect air supply fitting mated to the male fitting to allow the plug and first end of the valve stem to enter the female fitting when the valve stem is forced rearwardly by the rearwardly moving trigger actuated hopper gun air stem whereby the at least one air inlet port of the valve stem is moved into the air stream allowing the pressurized air to flow through the valve stem and out the second end thereof to enter the hopper gun air stem for propelling the texture coating mixture and the like.

3. The air shutoff valve for a hopper gun of claim 2 wherein the valve stem is formed of 0.175 inch O.D. brass tube having an I.D. of 0.165 inches and a length of 6 inches.

4. The air shutoff valve for a hopper gun of claim 3 wherein the valve stem has a pair of 0.080 inch diameter opposing air inlet ports through the wall thereof 0.310 inches from the first end thereof.

5. The air shutoff valve for a hopper gun of claim 4 wherein the plug is formed of neoprene.

6. The air shutoff valve for a hopper gun of claim 5 wherein the plug is 0.210 inches long and has a large end diameter of 0.185 inches tapering to 0.175 inches at the small end thereof.

7. The air shutoff valve for a hopper gun of claim 6 wherein the plug further includes a resilient cylindrical lug integrally formed thereon, the lug projecting coaxially from the small end of the plug, the lug having a plurality of resilient annular barbs formed thereon, the lug being frictionally engaged within the first end of the valve stem whereby fixedly connecting the plug is to the first end of the valve stem.

8. A new air shutoff valve for a hopper gun for on/off control of inlet air synchronized to existing on/off control of texture coating and the like in a hopper spray gun having a conventional male quick disconnect air inlet fitting which feeds pressurized air into an inlet end of a longitudinally rearwardly movable trigger actuated air stem for propelling the texture coating mixture and the like onto a surface to be coated, the air shutoff valve for a hopper gun comprising:

a tubular valve stem disposed within the air stem of the hopper gun such that an open first end of the valve stem lies within the male quick disconnect air fitting proximal the inlet aperture of the fitting, the valve stem having at least one air inlet port through a wall thereof proximal the first end thereof, the valve stem also having an open second end; and a valve control element for controlling airflow into the hopper gun by selectively obstructing the inlet aperture of the male quick disconnect air fitting, the valve control element comprising a resilient conical frustum-shaped plug having a large end diameter larger than the inside diameter of the male fitting inlet aperture and a small end diameter smaller than the inside diameter of the male fitting inlet aperture, the plug being disposed partially within the inlet end of the male fitting such that the large end lies outside the inlet aperture whereby pressurized air attempting to enter the fitting will seat the plug against the inlet aperture to stop the airflow, the small end of the plug being fixedly connected to the first end of the valve stem such that the plug projects longitudinally therefrom and prevents pressurized air from flowing therethrough, the large end of the plug being smaller than the inside diameter of a female quick disconnect air supply fitting mated to the male fitting to allow the plug and first end of the valve stem to enter the female fitting when the valve stem is forced rearwardly by the rearwardly moving trigger actuated hopper gun air stem whereby the at least one air inlet port of the valve stem is moved into the air stream allowing the pressurized air to flow through the valve stem and out the second end thereof to enter the hopper gun air stem for propelling the texture coating mixture and the like.

9. The air shutoff valve for a hopper gun of claim 8 wherein the valve stem is formed of 0.175 inch O.D. brass tube having an I.D. of 0.165 inches and a length of 6 inches.

10. The air shutoff valve for a hopper gun of claim 9 wherein the valve stem has a pair of 0.080 inch diameter opposing air inlet ports through the wall thereof 0.310 inches from the first end thereof.

11. The air shutoff valve for a hopper gun of claim 10 wherein the plug is formed of neoprene.

12. The air shutoff valve for a hopper gun of claim 11 wherein the plug is 0.210 inches long and has a large end diameter of 0.185 inches tapering to 0.175 inches at the small end thereof.

13. The air shutoff valve for a hopper gun of claim 12 wherein the plug further includes a resilient cylindrical lug integrally formed thereon, the lug projecting coaxially from the small end of the plug, the lug having a plurality of resilient annular barbs formed thereon, the lug being frictionally engaged within the first end of the valve stem whereby fixedly connecting the plug is to the first end of the valve stem.

* * * * *